(12) United States Patent
Yang

(10) Patent No.: US 10,397,903 B2
(45) Date of Patent: Aug. 27, 2019

(54) METHOD FOR TRANSMITTING HARQ-ACK INFORMATION IN MULTI-CELL ENVIRONMENT, AND APPARATUS THEREFOR

(71) Applicant: LG ELECTRONICS INC., Seoul (KR)

(72) Inventor: Suckchel Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 13 days.

(21) Appl. No.: 15/541,641

(22) PCT Filed: Jan. 5, 2016

(86) PCT No.: PCT/KR2016/000060
§ 371 (c)(1),
(2) Date: Jul. 5, 2017

(87) PCT Pub. No.: WO2016/111527
PCT Pub. Date: Jul. 14, 2016

(65) Prior Publication Data
US 2018/0027537 A1    Jan. 25, 2018

Related U.S. Application Data

(60) Provisional application No. 62/128,985, filed on Mar. 5, 2015, provisional application No. 62/100,016, filed on Jan. 5, 2015.

(51) Int. Cl.
| | |
|---|---|
| *H04W 72/04* | (2009.01) |
| *H04L 1/18* | (2006.01) |
| *H04L 5/00* | (2006.01) |
| *H04L 27/26* | (2006.01) |
| *H04W 52/32* | (2009.01) |
| *H04W 52/58* | (2009.01) |

(52) U.S. Cl.
CPC ....... *H04W 72/0406* (2013.01); *H04L 1/1812* (2013.01); *H04L 1/1861* (2013.01);
(Continued)

(58) Field of Classification Search
CPC . H04W 72/0406; H04W 52/58; H04W 52/32; H04W 72/044; H04L 5/001;
(Continued)

(56) References Cited

U.S. PATENT DOCUMENTS 8,462,688 B1 * 6/2013 Dinan ................. H04W 74/006
370/312
9,544,885 B2 * 1/2017 You .......................... H04J 11/00
(Continued)

FOREIGN PATENT DOCUMENTS

| WO | WO-2013112003 A1 * | 8/2013 | ........... H04L 1/1861 |
|---|---|---|---|
| WO | WO 2014/017746 A1 | 1/2014 | |
| WO | WO 2014/038908 A1 | 3/2014 | |

*Primary Examiner* — Tejis Daya
(74) *Attorney, Agent, or Firm* — Birch, Stewart, Kolasch & Birch, LLP

(57) ABSTRACT

The present invention relates to a wireless communication system. Specifically, the present invention relates to a method for transmitting control information, and an apparatus therefor, the method comprising: a step of detecting one or more PDSCHs on a plurality of cells, wherein the plurality of cells are divided into a first cell set including a PCell and a first SCell, and a second cell set including one or more second SCells; and a step of transmitting, as feedback for the one or more PDSCHs, HARQ-ACK information through a PUCCH, wherein if the one or more PDSCHs are detected only on the first cell set, the HARQ-ACK information includes HARQ-ACK responses only for the first cell set, and if the one or more PDSCHs are detected at least on the second cell set, the HARQ-ACK information includes HARQ-ACK responses for both the first and second cell sets.

8 Claims, 10 Drawing Sheets

(52) U.S. Cl.
CPC ............ *H04L 5/001* (2013.01); *H04L 5/0055* (2013.01); *H04L 27/2605* (2013.01); *H04W 52/32* (2013.01); *H04W 52/58* (2013.01); *H04W 72/044* (2013.01)

(58) Field of Classification Search
CPC ............... H04L 27/2601; H04L 1/1812; H04L 27/2605; H04L 5/0055; H04L 1/1861; H04L 27/26
See application file for complete search history.

(56) References Cited

U.S. PATENT DOCUMENTS

| | | | |
|---|---|---|---|
| 2013/0242799 A1* | 9/2013 | Yin | H04L 1/1861 370/254 |
| 2014/0092865 A1* | 4/2014 | Heo | H04W 4/70 370/331 |
| 2014/0126520 A1* | 5/2014 | Quan | H04W 74/0866 370/329 |
| 2014/0133474 A1* | 5/2014 | Damnjanovic | H04W 52/30 370/336 |
| 2014/0161060 A1* | 6/2014 | Nam | H04L 5/0055 370/329 |
| 2014/0192738 A1* | 7/2014 | Nam | H04L 5/001 370/329 |
| 2014/0192775 A1* | 7/2014 | Li | H04W 36/0072 370/331 |
| 2014/0334419 A1* | 11/2014 | Yang | H04L 1/1861 370/329 |
| 2015/0223234 A1* | 8/2015 | Seo | H04W 52/146 370/329 |
| 2016/0269974 A1* | 9/2016 | Dinan | H04L 5/0053 |

\* cited by examiner

If the one or more PDSCHs are detected only on the first cell set, the HARQ-ACK information includes HARQ-ACK responses only for the first cell set; and If the one or more PDSCHs are detected at least on the second cell set, the HARQ-ACK information includes HARQ-ACK responses for both the first and second cell sets.

METHOD FOR TRANSMITTING HARQ-ACK INFORMATION IN MULTI-CELL ENVIRONMENT, AND APPARATUS THEREFOR

CROSS REFERENCE TO RELATED APPLICATIONS

This application is the National Phase of PCT International Application No. PCT/KR2016/000060, filed on Jan. 05, 2016, which claims priority under 35 U.S.C. 119(e) to U.S. Provisional Application Nos. 62/100,016, filed on Jan. 05, 2015 and 62/128,985, filed on Mar. 05, 2015, all of which are hereby expressly incorporated by reference into the present application.

TECHNICAL FIELD

The present invention relates to a wireless communication system, and more specifically, to a method for transmitting control information and a device for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DETAILED DESCRIPTION OF THE INVENTION

Technical Problems

An object of the present invention is to provide a method of efficiently transmitting control information in a wireless communication system and an apparatus therefor. Another object of the present invention is to provide a method of efficiently transmitting uplink control information and efficiently managing resources on which the uplink control information is transmitted in a carrier aggregation (CA) system and an apparatus therefor.

The technical problems solved by the present invention are not limited to the above technical problems and those skilled in the art may understand other technical problems from the following description.

Technical Solutions

According to an aspect of the present invention, provided herein is a method of transmitting control information by a user equipment (UE) in a wireless communication system, including detecting one or more physical downlink shared channels (PDSCHs) on a plurality of cells, wherein the plural cells are divided into a first cell set including a primary cell (PCell) and a first secondary cell (SCell) and a second cell set including one or more second SCells; and transmitting hybrid automatic repeat request acknowledgement (HARQ-ACK) information through a physical uplink control channel (PUCCH) as feedback for the one or more PDSCHs, wherein if the one or more PDSCHs are detected only on the first cell set, the HARQ-ACK information includes HARQ-ACK responses only for the first cell set, and if the one or more PDSCHs are detected at least on the second cell set, the HARQ-ACK information includes HARQ-ACK responses for both the first and second cell sets.

In another aspect of the present invention, provided herein is a user equipment (UE) for transmitting control information in a wireless communication system, including a radio frequency (RF) unit; and a processor, wherein the processor is configured to detect one or more physical downlink shared channels (PDSCHs) on a plurality of cells, the plural cells being divided into a first cell set including a primary cell (PCell) and a first secondary cell (SCell) and a second cell set including one or more second SCells, and transmit hybrid automatic repeat request acknowledgement (HARQ-ACK) information through a physical uplink control channel (PUCCH) as feedback for the one or more PDSCHs, and wherein if the one or more PDSCHs are detected only on the first cell set, the HARQ-ACK information includes HARQ-ACK responses only for the first cell set, and if the one or more PDSCHs are detected at least on the second cell set, the HARQ-ACK information includes HARQ-ACK responses for both the first and second cell sets.

If the one or more PDSCHs are detected only on the first cell set, the HARQ-ACK information may be transmitted using a first PUCCH format and, if the one or more PDSCHs are detected at least on the second cell set, the HARQ-ACK information may be transmitted using a second PUCCH format, and a payload size of the second PUCCH format may be greater than a payload size of the first PUCCH format.

The first the first PUCCH format may be PUCCH format 1b and the payload size of the first PUCCH format may be 2 bits .

If the one or more PDSCHs are detected only on the first cell set, the HARQ-ACK information may be transmitted using a PUCCH format 1b based channel selection scheme.

A transmit power control (TPC) field of a physical downlink control channel (PDCCH) corresponding to a PDSCH detected in an SCell in the first cell set may be used to indicate power control information and a TPC field of a PDCCH corresponding to a PDSCH detected in an SCell in the second cell set may be used to indicate PUCCH resource indication information.

Advantageous Effects

According to the present invention, control information can be efficiently transmitted in a wireless communication system. Specifically, uplink control information can be efficiently transmitted and resources on which the uplink control information is transmitted can be efficiently managed in a CA system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Figure 1:
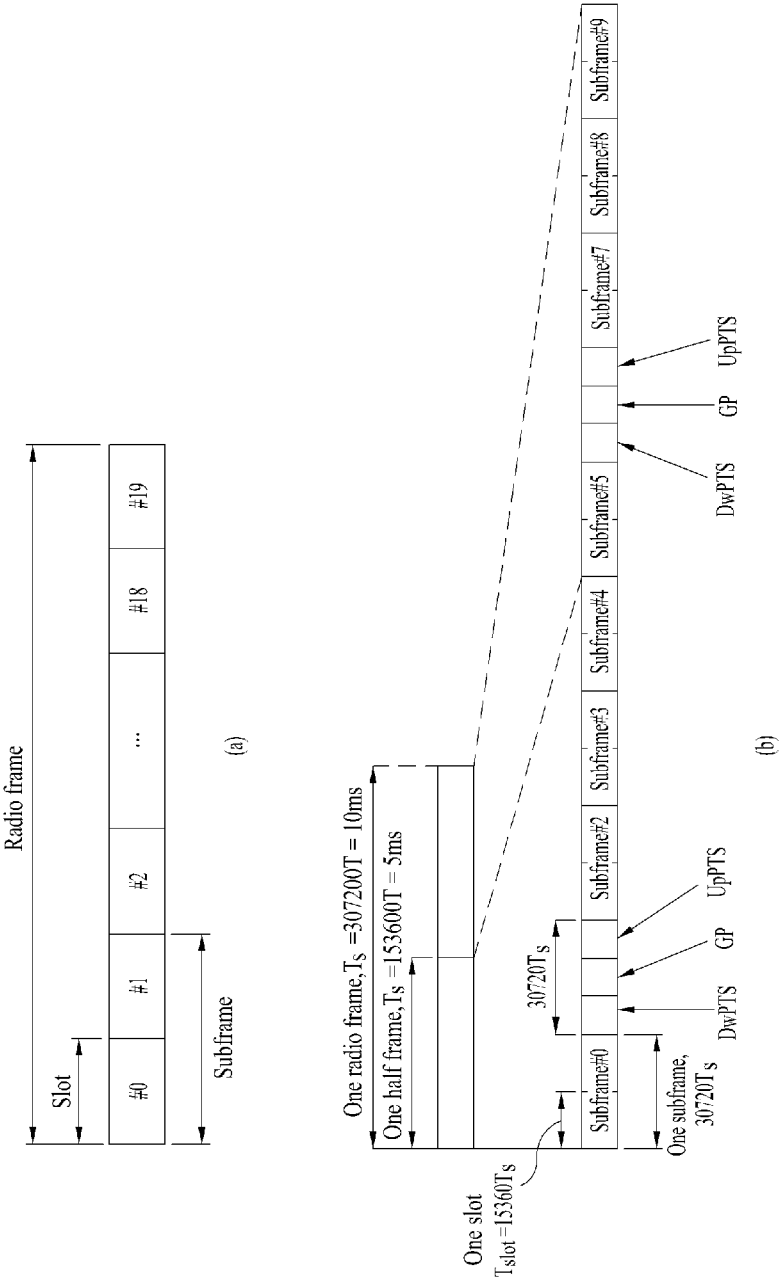
FIG. 1 illustrates a radio frame structure.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

While the following description is given, centering on 3GPP LTE/LTE-A to clarify the description, this is purely exemplary and thus should not be construed as limiting the present invention.

The terms used in the specification will now be described.

HARQ-ACK (Hybrid Automatic Repeat reQuest Acknowledgement): This represents a reception response result to downlink (DL) transmission, i.e., an ACK/negative ACK (NACK)/discontinuous transmission (DTX) response (simply, ACK/NACK (response), ACK/NAK (response), or A/N (response). The ACK/NACK response refers to ACK, NACK, DTX, or NACK/DTX. Herein, DL transmission requiring HARQ-ACK feedback includes, for example, a physical downlink shared channel (PDSCH) and a semi-persistent scheduling (SPS) release physical downlink control channel (PDCCH).

HARQ-ACK for a cell (or component carrier (CC)): This represents an ACK/NACK response to DL transmission scheduled for the cell.

PDSCH: This includes a PDSCH corresponding to a DL grant PDCCH and an SPS PDSCH. The PDSCH is used interchangeably with a transport block or a CW. The PDSCH corresponding to the DL grant PDCCH is used interchangeably with a PDSCH with a PDCCH.

SPS PDSCH: This refers to a PDSCH transmitted on DL using resources configured semi-statically by SPS. The SPS PDSCH has no DL grant PDCCH corresponding thereto. In this specification, the SPS PDSCH is used interchangeably with a PDSCH without a PDCCH.

SPS release PDCCH: This refers to a PDCCH indicating SPS release. A UE feeds back ACK/NACK information about the SPS release PDCCH on uplink (UL).

PUCCH (Physical Uplink Control Channel) index: This corresponds to a PUCCH resource. The PUCCH index indicates, for example, a PUCCH resource index. The PUCCH resource index is mapped to at least one of an orthogonal cover (OC), a cyclic shift (CS), and a physical resource block.

ARI (ACK/NACK Resource Indicator): This is used to indicate a PUCCH resource. For example, the ARI may be used to indicate a resource change value (e.g., offset) for a specific PUCCH resource (group) (configured by higher layers). As another example, the ARI may be used to indicate a specific PUCCH resource (group) index in a PUCCH resource (group) set (configured by higher layers).

Implicit PUCCH resource: This represents a PUCCH resource/index linked to the lowest CCE index of a PDCCH that schedules a PCC or is transmitted on the PCC (refer to Equation 1).

Explicit PUCCH resource: This may be indicated using an ARI.

PDCCH that schedules a CC: This indicates a PDCCH that schedules a PDSCH on the CC. That is, the PDCCH that schedules a CC refers to a PDCCH corresponding to a PDSCH on the CC.

FIG. 1 illustrates a radio frame structure. In a cellular OFDM wireless packet communication system, uplink/downlink data packet transmission is performed on a sub-frame-by-subframe basis. A subframe is defined as a predetermined time interval including a plurality of OFDM symbols. LTE(-A) supports a type-1 radio frame structure for FDD (frequency division duplex) and a type-2 radio frame structure for TDD (time division duplex).

FIG. 1(a) illustrates the type-1 radio frame structure. A DL radio frame includes 10 subframes, each subframe including two slots in the time domain. A time required to transmit one subframe is defined as a transmission time interval (TTI). For example, one subframe may be 1 ms long and one slot may be 0.5 ms long. One slot includes a plurality of OFDM symbols in the time domain and a plurality of resource blocks (RBs) in the frequency domain. Since an LTE(-A) system uses OFDMA for DL, an OFDM symbol indicates one symbol period. The OFDM symbol may be called an SC-FDMA symbol or symbol period. An RB is a resource allocation unit including a plurality of contiguous subcarriers in one slot.

The number of OFDM symbols included in one slot may be changed according to configuration of a cyclic prefix (CP). For example, if each OFDM symbol is configured to include a normal CP, one slot may include 7 OFDM symbols. If each OFDM symbol is configured to include an extended CP, one slot may include 6 OFDM symbols.

FIG. 1(b) illustrates a type-2 radio frame structure. The type-2 radio frame includes 2 half frames. Each half frame includes 5 subframes. One subframe consists of 2 slots.

Table 1 shows UL-DL configurations (UL-DL Cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe.

The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Table 2 shows DwPTS/GP/UpPTS lengths according to special subframe configurations. In Table 2, Ts denotes sampling time.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The radio frame structure is exemplary and the number of subframes, the number of slots and the number of symbols in a radio frame can vary.

Figure 2:
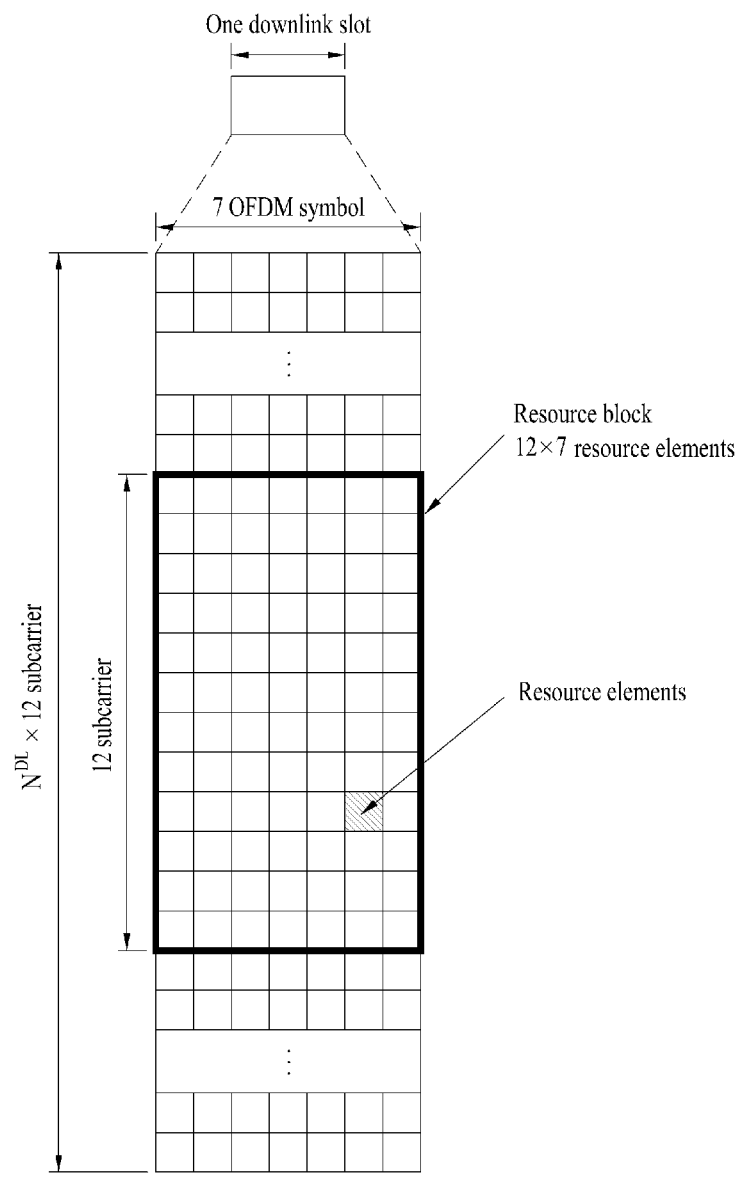
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
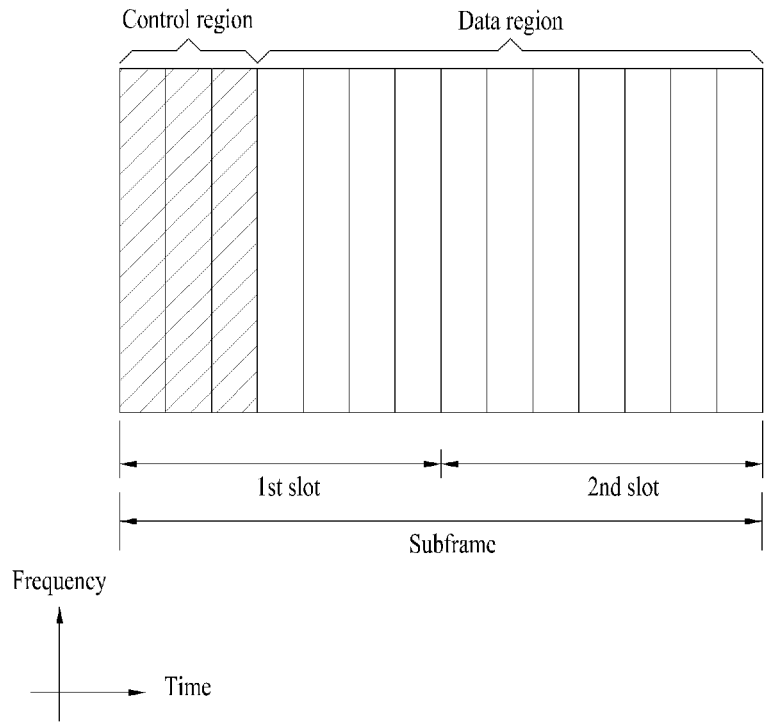
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
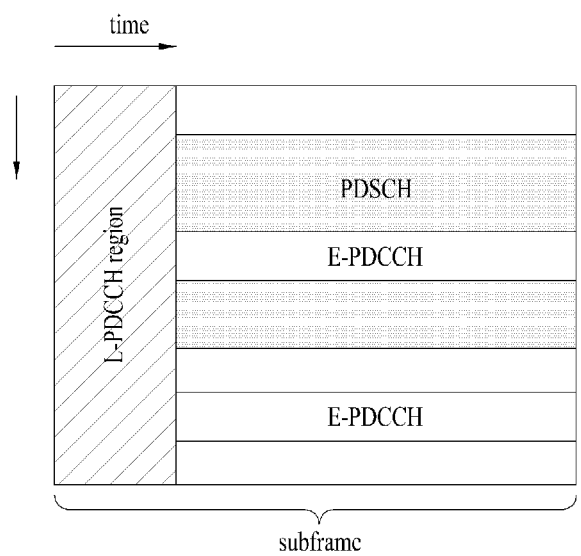
FIG. 4 illustrates an enhanced physical downlink control channel (EPDCCH)

FIG. 4 illustrates an EPDCCH. The EPDCCH is an additionally introduced channel in LTE-A.

Referring to FIG. 4, a PDCCH according to legacy LTE (for convenience, a legacy PDCCH or L-PDCCH) may be assigned to a control region of a subframe (refer to FIG. 3). In FIG. 3, the L-PDCCH region refers to a region to which the L-PDCCH can be allocated. On the other hand, a PDCCH may be additionally allocated to a data region (e.g., a resource region for a PDSCH). The PDCCH allocated to the data region is referred to as an EPDCCH. As indicated, scheduling constraint caused by limited control channel resources of the L-PDCCH region can be relieved by additionally securing control channel resources through the EPDCCH. Similar to the L-PDCCH, the EPDCCH carries DCI. For example, the EPDCCH may carry DL scheduling information and UL scheduling information. As an example, a UE may receive the EPDCCH and receive data/control information through a PDSCH corresponding to the EPDCCH. In addition, the UE may receive the EPDCCH and transmit data/control information through a PUSCH corresponding to the EPDCCH. The EPDCCH/PDSCH may be allocated starting from the first OFDM symbol of a subframe depending on cell type.

Figure 5:
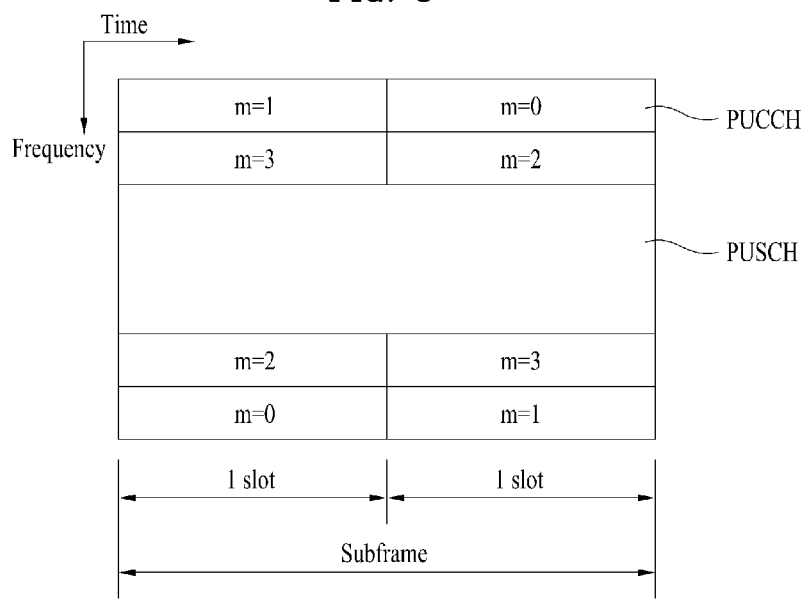
FIG. 5 illustrates an uplink subframe structure.

FIG. 5 illustrates an uplink subframe structure.

Referring to FIG. 5, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding Multiple Input Multiple Output (MIMO) includes Rank Indicator (RI) and Precoding Matrix Indicator (PMI). 20 bits are used for each subframe.

Table 3 shows the mapping relationship between PUCCH formats and UCI in LTE.

TABLE 3

| PUCCH format | UCI (Uplink Control Information) |
| --- | --- |
| Format 1 | SR (Scheduling Request) (non-modulated waveform |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | HARQ ACK/NACK + SR (48 bits) |

Figure 6:
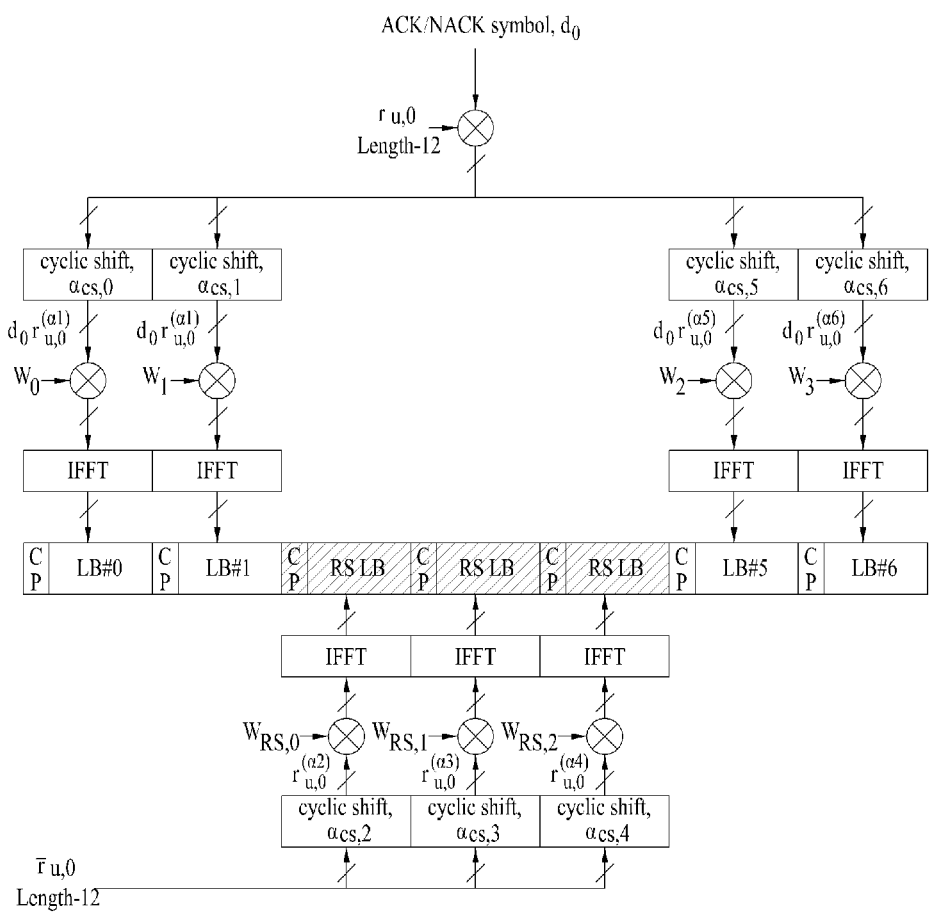
FIG. 6 illustrates a slot level structure of PUCCH format 1a/1b.

FIG. 6 illustrates a slot level structure of PUCCH formats 1a/1b. The PUCCH formats 1a/1b are used for ACK/NACK transmission. In the case of normal CP, SC-FDMA symbols #2, #3 and #4 are used for DM RS transmission. In the case of extended CP, SC-FDMA symbols #2 and #3 are used for DM RS transmission. Accordingly, 4 SC-FDMA symbols in a slot are used for ACK/NACK transmission. PUCCH format 1a/1b is called PUCCH format 1 for convenience.

Referring to FIG. 6, 1-bit [b(0)] and 2-bit [b(0)b(1)] ACK/NACK information are modulated according to BPSK and QPSK modulation schemes respectively, to generate one ACK/NACK modulation symbol d0. Each bit [b(i), i=0, 1] of the ACK/NACK information indicates a HARQ response to a corresponding DL transport block, corresponds to 1 in the case of positive ACK and corresponds to 0 in case of negative ACK (HACK). Table 4 shows a modulation table defined for PUCCH formats 1a and 1b in LTE.

TABLE 4

| PUCCH format | b(0), . . . , b($M_{bit}$ − 1) | d(0) |
| --- | --- | --- |
| 1a | 0 | 1 |
|  | 1 | −1 |
| 1b | 00 | 1 |
|  | 01 | −j |
|  | 10 | j |
|  | 11 | −1 |

PUCCH formats 1a/1b perform time domain spreading using an orthogonal spreading code (e.g. Walsh-Hadamard or DFT code) $w_0$, $w_1$, $w_2$, $w_3$ in addition to cyclic shift $\alpha_{cs,x}$ in the frequency domain. In the case of PUCCH formats 1a/1b, a larger number of UEs can be multiplexed on the same PUCCH RB because code multiplexing is used in both frequency and time domains.

Figure 7:
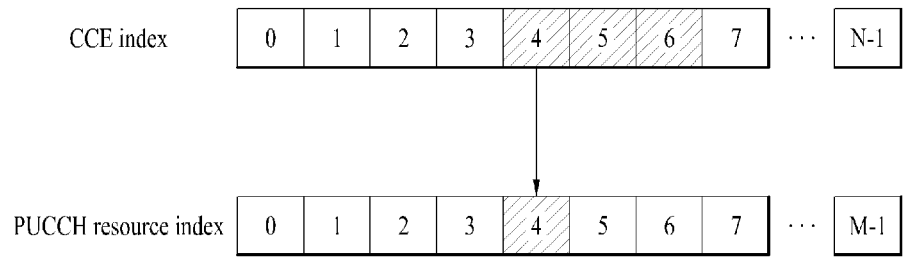
FIG. 7 illustrates an example of determining a PUCCH resource for ACK/NACK.

FIG. 7 illustrates an example of determining PUCCH resources for ACK/NACK. In LTE(-A), a plurality of PUCCH resources for ACK/NACK are shared by a plurality of UEs in a cell every time the UEs need the PUCCH resources rather than allocated to UEs in advance. Specifically, a PUCCH resource used by a UE to transmit an ACK/NACK signal corresponds to a PDCCH on which scheduling information on DL data involving the ACK/NACK signal is delivered or a PDCCH that indicates SPS release. A PDCCH transmitted in a DL subframe to the UE is composed of a plurality of control channel elements (CCEs). The UE can transmit ACK/NACK through a PUCCH resource corresponding to a specific one (e.g. first CCE) of the CCEs constituting the received PDCCH.

Referring to FIG. 7, each block in a Downlink Component Carrier (DL CC) represents a CCE and each block in an Uplink Component Carrier (UL CC) indicates a PUCCH resource. Each PUCCH index corresponds to a PUCCH resource for an ACK/NACK signal. If information on a PDSCH is delivered on a PDCCH composed of CCEs #4, #5 and #6, as shown in FIG. 6, a UE transmits an ACK/NACK signal on PUCCH #4 corresponding to CCE #4, the first CCE of the PDCCH.

Specifically, a PUCCH resource index in LTE(-A) is determined as follows.

$$n^{(1)}_{PUCCH} = n_{CCE} + N^{(1)}_{PUCCH}$$ [Equation 1]

Here, $n^{(1)}_{PUCCH}$ represents a resource index of PUCCH format 1a/1b for ACK/NACK/DTX transmission, $N^{(1)}_{PUCCH}$ denotes a signaling value received from a higher layer, and $n_{CCE}$ denotes the smallest value of CCE indexes used for PDCCH transmission. A cyclic shift, an orthogonal spreading code and a Physical Resource Block (PRB) for PUCCH formats 1a/1b are obtained from $n^{(1)}_{PUCCH}$.

Since an LTE UE cannot simultaneously transmit a PUCCH and a PUSCH, UCI (e.g. CQI/PMI, HARQ-ACK, RI, etc.) is multiplexed to a PUSCH region (PUSCH piggyback) when the UCI needs to be transmitted through a subframe in which a PUSCH is transmitted. An LTE-A UE may also be configured such that the UE cannot simultaneously transmit a PUCCH and a PUSCH. In this case, the UE can multiplex UCI (e.g. CQI/PMI, HARQ-ACK, RI, etc.) to a PUSCH region (PUSCH piggyback) when the UCI needs to be transmitted through a subframe in which a PUSCH is transmitted.

Figure 8:
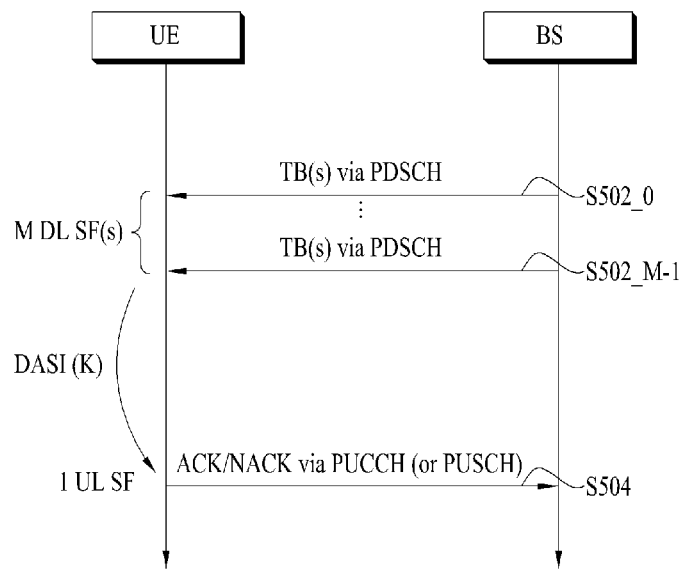
FIG. 8 illustrates a TDD UL ACK/NACK (uplink acknowledgement/negative acknowledgement) transmission process in a single cell situation.

FIG. 8 illustrates a TDD UL ACK/NACK transmission process in a single cell situation.

Referring to FIG. 8, a UE can receive one or more DL signals (e.g. PDSCH signals) in M DL subframes (SFs) (S502_0 to S502_M-1). Each PDSCH signal is used to transmit one or more (e.g. 2) transport blocks (TBs) (or codewords (CWs)) according to transmission mode. A PDCCH signal requiring an ACK/NACK response, for example, a PDCCH signal indicating SPS (semi-persistent scheduling) release (simply, SPS release PDCCH signal) may also be received in step S502_0 to S502_M-1, which is not shown. When a PDSCH signal and/or an SPS release PDCCH signal are present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M-1. While ACK/NACK is transmitted through a PUCCH basically, ACK/NACK can be transmitted through a PUSCH when a PUSCH is transmitted at ACK/NACK transmission time. Various PUCCH formats shown in Table 3 can be used for ACK/NACK transmission. To reduce the number of transmitted ACK/NACK bits, various methods such as ACK/NACK bundling and ACK/NACK channel selection can be used.

As described above, in TDD, ACK/NACK relating to data received in the M DL subframes is transmitted through one UL subframe (i.e. M DL SF(s):1 UL SF) and the relationship therebetween is determined by a DASI (Downlink Association Set Index).

Table 5 shows DASI (K: $\{k0, k1, \ldots, k_{M-1}\}$) defined in LTE(-A). Table 5 shows spacing between a UL subframe transmitting ACK/NACK and a DL subframe relating to the UL subframe. Specifically, when a PDCCH that indicates PDSCH transmission and/or (downlink) SPS release is present in a subframe n−k (k∈K), the UE transmits ACK/NACK in a subframe n.

TABLE 5

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Meanwhile, in FDD, ACK/NACK relating to data received in one DL subframe is transmitted through one UL subframe and k=4. That is, if a PDSCH and/or an SPS release PDCCH is present in subframe n−4, the UE transmits corresponding ACK/NACK in subframe n.

In TDD operation, the UE needs to transmit an ACK/NACK signal for one or more DL signals (e.g. PDSCH) received through m DL SFs through one UL SF. Transmission of ACKs/NACKs for a plurality of DL SFs through one UL SF is performed according to the following methods.

1) ACK/NACK bundling: ACK/NACK bits for a plurality of data units (e.g. PDSCH, SPS release PDCCH, etc.) are combined according to a logical operation (e.g. logical AND operation). For example, upon successful decoding of all data units, a receiver (e.g. UE) transmits ACK signals. If any of data units has not been decoded (detected), the receiver does not transmit a NACK signal or no signal.

2) Channel selection: Upon reception of a plurality of data units (e.g. PDSCH, SPS release PDCCH, etc.), a UE occupies a plurality of PUCCH resources for ACK/NACK transmission. ACK/NACK responses to the plurality of data units are discriminated according to combinations of PUCCH resources used for ACK/NACK transmission and transmitted ACK/NACK information (e.g. bit values, QPSK symbol values). Channel selection is also called ACK/NACK selection and PUCCH selection.

Channel selection will now be described in more detail. According to channel selection, the UE occupies a plurality of uplink physical channel resources (e.g. PUCCH resources) in order to transmit multiplexed ACK/NACK signals when a plurality of downlink data is received. For example, upon reception of a plurality of PDSCHs, the UE can occupy as many PUCCH resources as the number of PDSCHs using a specific CCE of a PDCCH that indicates each PDSCH. In this case, the UE can transmit ACK/NACK signals multiplexed using a combination of information about a PUCCH selected from the occupied PUCCH resources and information about a modulation/coding scheme applied to the selected PUCCH resource.

Table 6 shows a mapping table for channel selection, defined in LTE.

TABLE 6

|  | Subframe | |
| --- | --- | --- |
| HARQ-ACK(0), HARQ-ACK(1), HARQ-ACK(2), HARQ-ACK(3) | $n^{(1)}_{PUCCH,i}$ | b(0), b(1) |
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 6, HARQ-ACK(i) indicates a HARQ ACK/NACK/DTX response of an i-th data unit (0≤i≤3). The HARQ ACK/NACK/DTX response includes ACK, NACK, DTX and NACK/DTX. NACK/DTX represents NACK or DTX. ACK and NACK represent whether a TB (equivalent to a CW) transmitted through a PDSCH has been successfully decoded or not. DTX (Discontinuous Transmission) represents that a PDCCH has not been successfully detected. Maximum 4 PUCCH resources (i.e., $n^{(1)}_{PUCCH,0}$ to $n^{(1)}_{PUCCH,3}$) can be occupied for each data unit. The multiplexed ACK/NACK signal is transmitted through one PUCCH resource selected from the occupied PUCCH resources. In Table 6, $n^{(1)}_{PUCCH,i}$ represents a PUCCH resource actually used for ACK/NACK transmission, and b(0)b(1) indicates two bits transmitted through the selected PUCCH resource, which are modulated using QPSK. For example, when the UE has decoded 4 data units successfully, the UE transmits bits (1, 1) to a BS through a PUCCH resource linked with $n^{(1)}_{PUCCH,1}$. Since combinations of PUCCH resources and QPSK symbols cannot represent all available ACK/NACK suppositions, NACK and DTX are coupled except in some cases (NACK/DTX, N/D).

Figure 9:
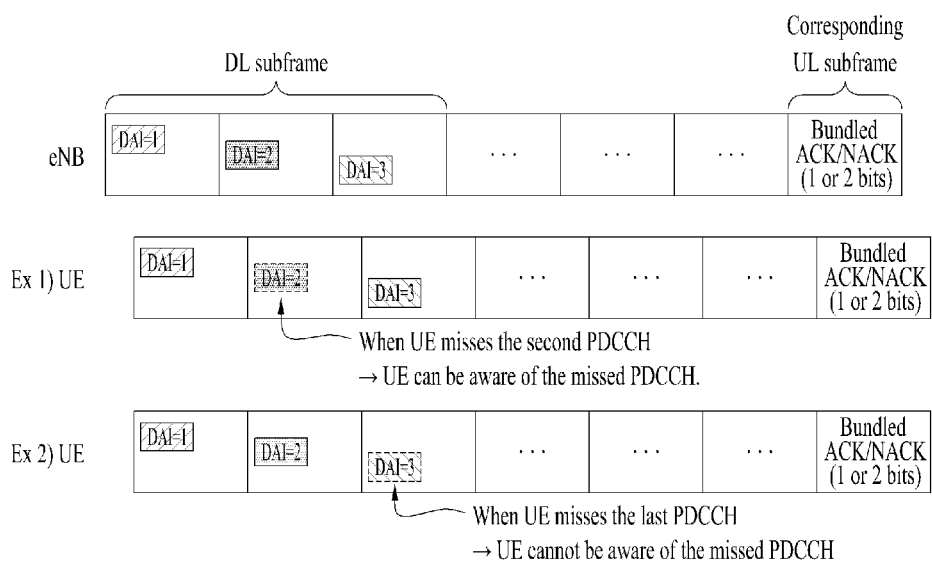
FIG. 9 illustrates a method of performing ACK/NACK transmission using a downlink assignment index (DAI)

FIG. 9 illustrates ACK/NACK transmission using a DL downlink assignment index (DAI). In this example, it is assumed that a TDD system is configured based on 3 DL subframes to 1 UL subframe. For convenience, it is assumed that the UE transmits ACK/NACK using a PUSCH resource. In LTE, upon transmitting ACK/NACK through the PUSCH resource, the UE transmits 1-bit or 2-bit bundled ACK/NACK.

Referring to FIG. 9, upon missing the second PDCCH as shown in the first example (Ex 1), the UE is aware that the second PDCCH has been missed because a DL DAI value of the third PDCCH differs from the number of PDCCHs detected until then. In this case, the UE may process an ACK/NACK response to the second PDCCH as NACK (or NACK/DTX). Meanwhile, upon missing the last PDCCH as shown in the second example (Ex 2), the UE is unable to be aware that the last PDCCH has been missed because a DAI value of the last PDCCH is equal to the number of PDCCHs detected until then (i.e., DTX). Hence, the UE recognizes that only two PDCCHs have been scheduled during a DL subframe duration. In this case, the UE performs bundling only on ACK/NACK corresponding to the first two PDCCHs and thus an error occurs in an ACK/NACK feedback procedure. To solve this problem, even a UL grant PDCCH includes a DAI field (i.e., a UL DAI field). The UL DAI field, which is a 2-bit field, indicates information about the number of scheduled PDCCHs. An initial value of the DL/UL DAI is set to 1 and indicates one of 1 to 4.

Figure 10:
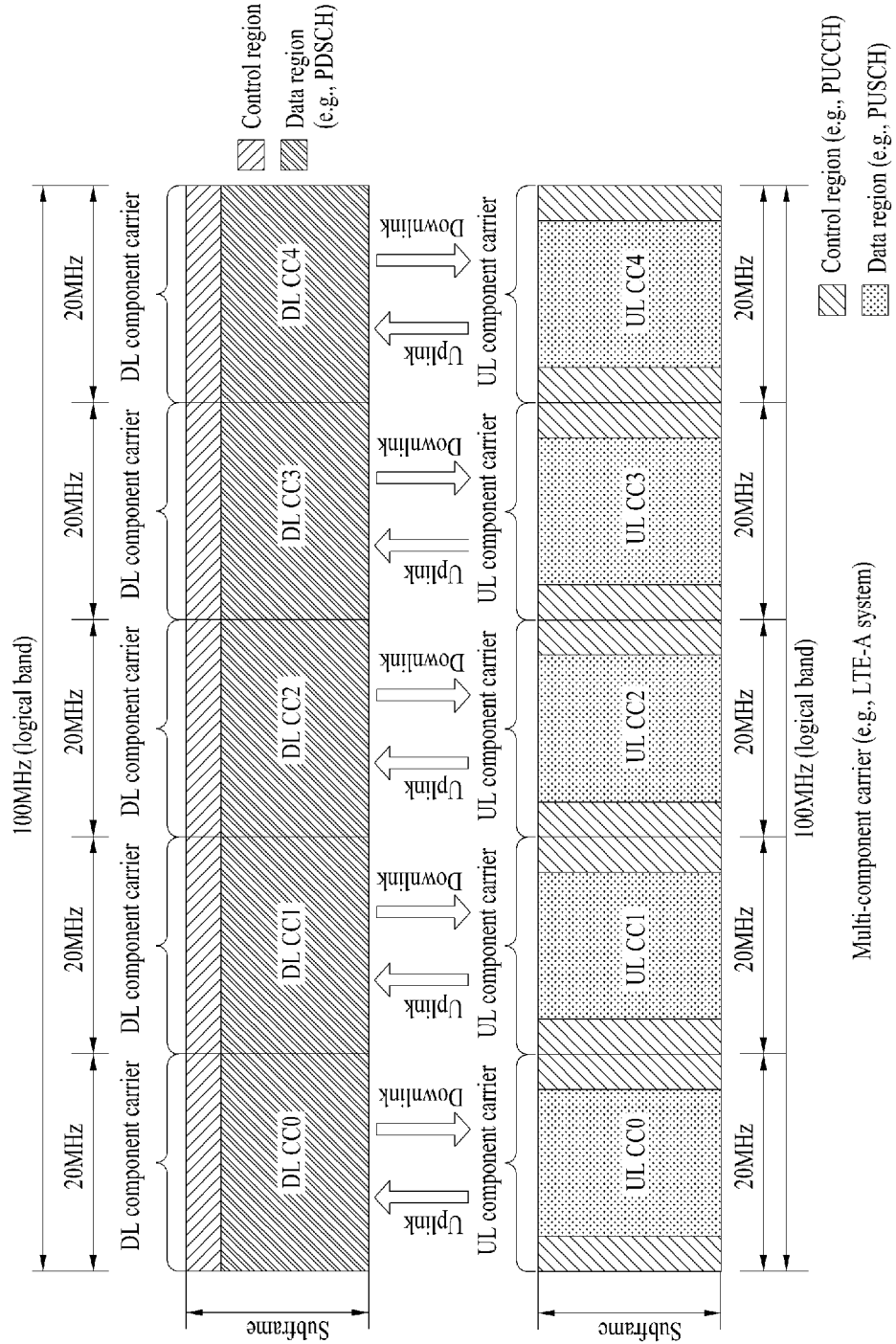
FIG. 10 illustrates a carrier aggregation (CA) communication system.

FIG. 10 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 10, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to L (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources [refer to 36.300 V10.2.0 (2010-12) 5.5. Carrier Aggregation; 7.5. Carrier Aggregation]. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the BS can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the BS schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 11:
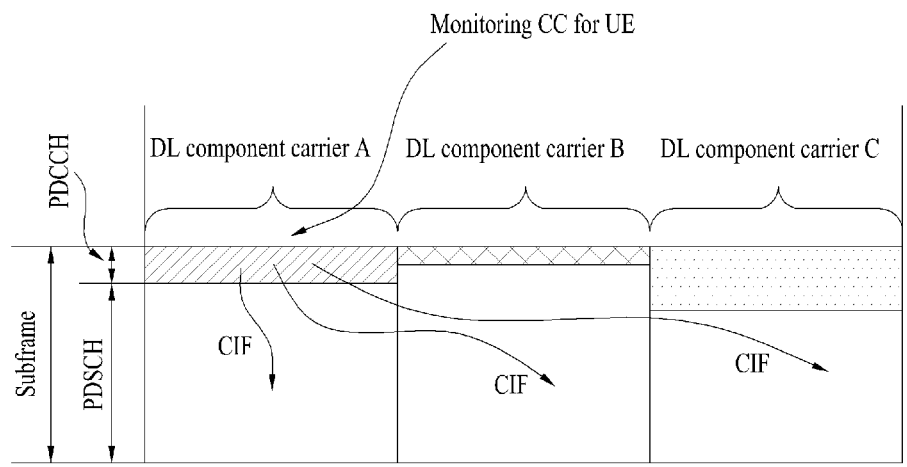
FIG. 11 illustrates scheduling in case of aggregation of a plurality of carriers.

FIG. 11 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

When a plurality of cells is aggregated, PUCCH format 3 is configured or PUCCH format 1b with channel selection may be configured as an A/N transmission scheme of the UE in order to feedback a large amount of A/N information.

Figure 12:
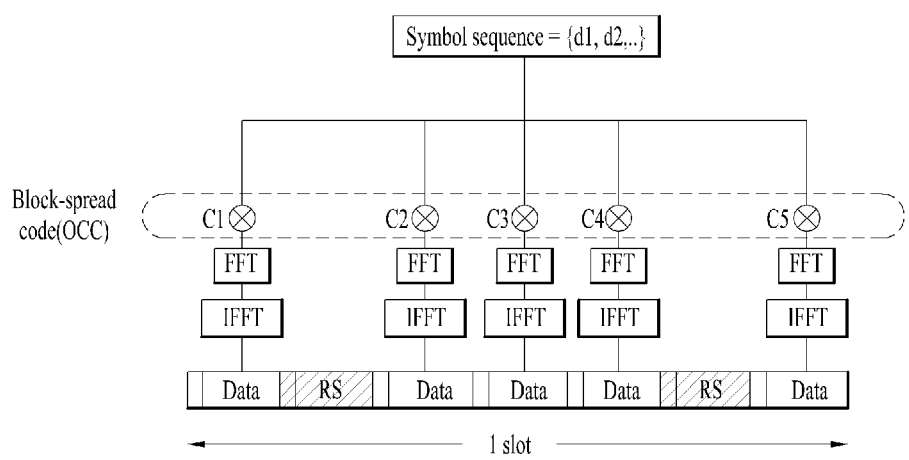
FIG. 12 illustrates a slot level structure of PUCCH format 3.

FIG. 12 illustrates a slot level structure of PUCCH format 3. PUCCH format 3 may be used to transmit a plurality of ACK/NACK information. Channel state information (CSI) and/or an SR may also be transmitted using PUCCH format 3.

Referring to FIG. 12, one symbol sequence is transmitted over the frequency domain and OCC-based time-domain spreading is applied to the symbol sequence. Specifically, 5 SC-FDMA symbols (i.e., a UCI data part) are generated from one symbol sequence {d1, d2, . . . } using a length-5 (or length-4) OCC (C1 to C5). Herein, the symbol sequence {d1, d2, . . . } may be a modulation symbol sequence or a CW bit sequence. The symbol sequence {d1, d2, . . . } may be generated by performing joint coding (e.g., Reed-Muller coding, tail-biting convolutional coding, etc.), block-spreading, and SC-FDMA modulation on a plurality of ACK/NACK information.

An ACK/NACK payload for PUCCH format 3 is configured on a per-cell basis and then the configured ACK/NACK payloads are concatenated according to cell index order. Specifically, HARQ-ACK feedback bits for a c-th serving cell (or DL CC) are given as $o_{c,0}^{ACK}$ $o_{c,1}^{ACK}$, . . . , $o_{c,O_c^{ACK}-1}^{ACK}$ (where c≥0). $O^{ACK}_c$ represents the number of bits (i.e., size) of a HARQ-ACK payload for the c-th serving cell. When a transmission mode supporting single TB transmission is configured or spatial bundling is used for the c-th serving cell, $O^{ACK}_c$ may be set as, $O^{ACK}_c = B^{DL}_c$. If a HARQ-ACK response represents ACK, a HARQ-ACK feedback bit is set to 1 and, if the HARQ-ACK response represents NACK or DTX, the HARQ-ACK feedback bit is set to 0.

If a transmission mode supporting transmission of multiple TBs (e.g., two TBs) is configured and spatial bundling is not used for the c-th serving cell, $O^{ACK}_c$ may be given as $O^{ACK}_c = 2B^{DL}_c$. When HARQ-ACK feedback bits are transmitted through a PUCCH or when the HARQ-ACK feedback bits are transmitted through a PUSCH but W corresponding to the PUSCH is not present (e.g., an SPS based PUSCH), $B^{DL}_c$ is given as $B^{DL}_c = M$. M denotes the number of elements in set K defined in Table 3. If TDD UL-DL Cfg is #1, #2, #3, #4, and #6 and HARQ-ACK feedback bits are transmitted through the PUSCH, $B^{DL}_c$ is given as $B^{DL}_c = W^{UL}_{DAI}$. Herein, $W^{UL}_{DAI}$ denotes a value indicated by a UL DAI field in a UL grant PDCCH (Table 7) and is simply shortened to W. If a TDD UL-DL Cfg is #5, then $B^{DL}_c = W^{UL}_{DAI} + 4\lceil (U-W^{UL}_{DAI})/4 \rceil$. Herein, U denotes a maximum value of Uc, Uc representing the total number of PDSCH(s) received in subframe n−k and PDCCHs indicating (DL) SPS release in a c-th serving cell. Subframe n is a subframe in which the HARQ-ACK feedback bits are transmitted. ⌈ ⌉ denotes a ceiling function.

When a transmission mode supporting transmission of a single TB is configured or spatial bundling is used for the c-th serving cell, the position of each ACK/NACK bit in the HARQ-ACK payload of the serving cell is given as $o_{c,DAI(k)-1}^{ACK}$. DAI(k) represents a DL DAI value detected from a DL subframe n−k. Meanwhile, when a transmission mode supporting transmission of multiple TBs (e.g., two TBs) is configured and spatial bundling is not used for the c-th serving cell, the positions of respective ACK/NACK bits in the HARQ-ACK payload of the serving cell are given as $o_{c,2DAI(k)-2}^{ACK}$ and $o_{c,2DAI(k)-1}^{ACK}$. Herein, $o_{c,2DAI(k)-2}^{ACK}$ represents HARQ-ACK for CW 0 and $o_{c,2DAI(k)-1}^{ACK}$ represents HARQ-ACK for CW 1. Codeword 0 and CW 1 correspond TB 0 and TB 1, respectively, or TB 1 and TB 0, respectively, according to swapping. When PUCCH format 3 is transmitted in a subframe configured for SR transmission, PUCCH format 3 is transmitted together with ACK/NACK bits and 1 SR bit.

Hereinafter, the case in which a channel selection scheme using PUCCH format 1b is configured for HARQ-ACK transmission in TDD CA will be described. It is assumed that two serving cells (i.e., a PCell and an SCell) having the same TDD UL-DL Cfg are aggregated First, a channel selection scheme using PUCCH format 1b when M≤2 in UL subframe n for HARQ-ACK transmission will be described. Herein, M denotes the number of elements in set K (i.e., the number of DL subframes corresponding to UL subframes) described above with reference to Table 5. When M≤2 in UL subframe n, a UE may transmit b(0)b(1) on a PUCCH resource selected from A PUCCH resources $n^{(1)}_{PUCCH,i}$ (where 0≤i≤A−1 and A ⊂ {2,3,4}). Specifically, the UE transmits an A/N signal in UL subframe n using PUCCH format 1b according to Tables 7 to 9. When M=1 in UL subframe n, HARQ-ACK(j) denotes an A/N response to a TB or an SPS release PDCCH in relation to serving cell c. When M=1, a TB, HARQ-ACK(j), and A PUCCH resources may be given by Table 10. When M=2 in UL subframe n, HARQ-ACK(j) denotes an A/N response to a TB or an SPS release PDCCH in DL subframe(s) provided by set K on each serving cell. Herein, when M=2, subframes and A PUCCH resources on each serving cell for HARQ-ACK(j) may be given according to Table 11.

Table 7 is a mapping table for channel selection defined in an LTE-A system, when two CCs having the same UL-DL Cfg are aggregated and when M=1 and A=2.

TABLE 7

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

Herein, $n^{(1)}_{PUCCH,0}$ may be assigned an implicit PUCCH resource linked to a PDCCH that schedules a PCC (or PCell) and $n^{(1)}_{PUCCH,1}$ may be assigned an implicit PUCCH resource linked to a PDCCH that schedules an SCC or an explicit PUCCH resource reserved through RRC according to whether cross-CC scheduling is configured. For example, in a cross-CC scheduling situation, $n^{(1)}_{PUCCH,0}$ may be assigned the implicit PUCCH resource linked to the PDCCH that schedules the PCC and $n^{(1)}_{PUCCH,1}$ may be assigned the implicit PUCCH resource linked to the PDCCH that schedules the SCC.

Table 8 is a mapping table for channel selection defined in the LTE-A system, when two CCs having the same UL-DL Cfg are aggregated and when M=1 and A=3.

TABLE 8

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

Herein, when a PCC is a MIMO CC and an SCC is a non-MIMO CC, $n^{(1)}_{PUCCH,0}$ and $n^{(1)}_{PUCCH,1}$ may be assigned implicit PUCCH resources linked to a PDCCH that schedules the PCC and $n^{(1)}_{PUCCH,2}$ may be assigned an implicit PUCCH resource linked to a PDCCH that schedules the SCC or an explicit PUCCH resource reserved through RRC according to whether cross-CC scheduling is configured. In addition, when the PCC is a non-MIMO CC and the SCC is a MIMO CC, $n^{(1)}_{PUCCH,0}$ may be assigned an implicit PUCCH resource linked to the PDCCH that schedules the PCC and $n^{(1)}_{PUCCH,1}$ and $n^{(1)}_{PUCCH,2}$ may be assigned implicit PUCCH resources linked to the PDCCH that schedules the SCC or explicit PUCCH resources reserved through RRC according to whether cross-CC scheduling is configured.

Table 9 is a mapping table for channel selection defined in the LTE-A system, when two CCs having the same UL-DL Cfg are aggregated and when M≤2 and A=4.

TABLE 9

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

Herein, $n^{(1)}_{PUCCH,0}$ and/or $n^{(1)}_{PUCCH,1}$ may be assigned implicit PUCCH resources linked to a PDCCH that schedules a PCC (or PCell) irrespective of whether cross-CC scheduling is configured and $n^{(1)}_{PUCCH,2}$ and/or $n^{(1)}_{PUCCH,3}$ may be assigned implicit PUCCH resources linked to a PDCCH that schedules an SCC or explicit PUCCH resources reserved through RRC according to whether cross-CC scheduling is configured. For example, when M=2 in a cross-CC scheduling situation, $n^{(1)}_{PUCCH,0}$ and $n^{(1)}_{PUCCH,1}$ may be assigned implicit PUCCH resources linked to PDCCHs that schedule PCCs of the first DL subframe and the second DL subframe, respectively, and $n^{(1)}_{PUCCH,2}$ and $n^{(1)}_{PUCCH,3}$ may be assigned implicit PUCCH resources linked to PDCCHs that schedule SCCs of the first DL subframe and the second DL subframe, respectively.

Table 10 illustrates TBs, HARQ-ACK(j), and PUCCH resources in M=1.

TABLE 10

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 Primary cell | TB1 Secondary cell | NA | NA |
| 3 | TB1 Primary cell | TB1 Secondary cell | TB2 Secondary cell | NA |
| 3 | TB1 Primary cell | TB2 Primary cell | TB1 Secondary cell | NA |
| 4 | TB1 Primary cell | TB2 Primary cell | TB1 Secondary cell | TB2 Secondary cell |

* TB: transport block, NA: not available

Table 11 shows TBs, HARQ-ACK(j), PUCCH resources when M=2.

TABLE 11

| A | HARQ-ACK(0) | HARQ-ACK(1) | HARQ-ACK(2) | HARQ-ACK(3) |
|---|---|---|---|---|
| 4 | The first subframe of Primary cell | The second subframe of Primary cell | The first subframe of Secondary cell | The second subframe of Secondary cell | downlink assignment index (DAI)-counter (c) of the PDCCH is i+1. Meanwhile, when a PDSCH without a PDCCH is present, HARQ-ACK(0) may mean an A/N response to the PDSCH without the PDCCH and HARQ-ACK(i) may mean an A/N response to a PDCCH (PDSCH corresponding to the PDCCH), DAI-c of which is i.

Table 12 is a mapping table for channel selection defined in the LTE-A system, when two CCs having the same UL-DL Cfg are aggregated and when M=3.

TABLE 12

| Primary Cell | Secondary Cell | Resource | Constellation | RM Code Input Bits |
|---|---|---|---|---|
| HARQ-ACK(0), HARQ-ACK(1), HARQ-ACK(2) | HARQ-ACK(0), HARQ-ACK(1), HARQ-ACK(2) | $n_{PUCCH}^{(1)}$ | b(0), b(1) | o(0), o(1), o(2), o(3) |
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

Next, a channel selection scheme using PUCCH format 1b when M>2 in UL subframe n for HARQ-ACK transmission will be described. A basic principle in this scheme is equal/similar to channel selection when M≤2. Specifically, the UE transmits an A/N signal using PUCCH format 1b in UL subframe n according to Tables 12 and 13. When M>2 in UL subframe $n_{PUCCH,0}^{(1)}$ and $n_{PUCCH,1}^{(1)}$ are associated with DL transmission(s) (e.g. PDSCH transmission(s)) on a PCell and $n_{PUCCH,2}^{(1)}$ and $n_{PUCCH,3}^{(1)}$ are associated with DL transmission(s) (e.g. PDSCH transmission(s)) on an SCell.

In addition, HARQ-ACK(i) on a cell basis may represent an A/N response to a PDCCH (PDSCH corresponding to the PDCCH) that schedules a corresponding cell, wherein Herein, $n_{PUCCH,0}^{(1)}$ and/or $n_{PUCCH,1}^{(1)}$ may be assigned implicit PUCCH resources linked to a PDCCH that schedules a PCC (or PCell) irrespective of whether cross-CC scheduling is applied and $n_{PUCCH,2}^{(1)}$ and/or $n_{PUCCH,3}^{(1)}$ may be assigned implicit PUCCH resources linked to a PDCCH that schedules an SCC or explicit PUCCH resources reserved through RRC according to whether cross CC scheduling is applied. For example, in a TDD situation, $n_{PUCCH,0}^{(1)}$ and $n_{PUCCH,1}^{(1)}$ may be assigned implicit PUCCH resources linked to a PDCCH that schedules a PCC, DAIs-c of the PDCCH being 1 and 2, respectively, and $n_{PUCCH,2}^{(1)}$ and $n_{PUCCH,3}^{(1)}$ may be assigned implicit PUCCH resources linked to a PDCCH that schedules an SCC, DAIs-c of the PDCCH being 1 and 2, respectively.

Table 13 is a mapping table for channel selection defined in the LTE-A system, when two CCs having the same UL-DL Cfg are aggregated and when M=4.

TABLE 13

| Primary Cell | Secondary Cell | Resource | Constellation | RM Code Input Bits |
|---|---|---|---|---|
| HARQ-ACK(0), HARQ-ACK(1), HARQ-ACK(2), HARQ-ACK(3) | HARQ-ACK(0), HARQ-ACK(1), HARQ-ACK(2), HARQ-ACK(3) | $n_{PUCCH}^{(1)}$ | b(0), b(1) | o(0), o(1), o(2), o(3) |
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK, NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX. | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |

TABLE 13-continued

| Primary Cell | Secondary Cell | Resource | Constellation | RM Code Input Bits |
|---|---|---|---|---|
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

Herein, $n_{PUCCH,0}^{(1)}$, $n_{PUCCH,1}^{(1)}$, $n_{PUCCH,2}^{(1)}$, and $n_{PUCCH,3}^{(1)}$ may be assigned as shown in Table 12.

A channel selection scheme using PUCCH format 1b in FDD CA is performed in a manner similar to a channel selection scheme using PUCCH format 1b when M=1 in TDD CA.

Embodiment: A/N Transmission for Enhanced CA

Currently, a Rel-10/11/12 based LTE-A system may support CA up to 5 cells/carriers (hereinafter, referred to collectively as cells) with respect to one UE. In addition, a PUCCH has a structure configured to be transmitted only through a PCell. Meanwhile, in future systems, aggregation of 5 or more cells with respect to one UE is under consideration for the purpose of higher data transmission rate. In this case, in consideration of increase in UCI size caused by increase in the number of cells, a new PUCCH format supporting a payload of a larger size than a legacy PUCCH format (e.g., PUCCH format 3) may be considered. In addition, in order to reduce increase in the number of UCI transmissions/UCI size and overhead of PUCCH resources in the PCell due to the increased UCI transmissions/UCI size, a method of enabling the PUCCH to be transmitted even through a specific SCell (hereinafter, ACell) may be considered.

In a legacy CA situation, a PUCCH format 1b based channel selection scheme (CHsel) or a PUCCH format 3 (hereinafter, PF3) based scheme may be configured as a HARQ-ACK (hereinafter, A/N) feedback transmission method. CHsel is applicable only to CA supporting two cells as a method of selecting/modulating one of a plurality of PUCCH format 1b (hereinafter, PF1) resources according to A/N states for all cells and transmitting the selected/modulated PF1 resource. In more detail, when cross-CC scheduling is configured, all (CHsel candidate) PF1 resources corresponding to respective cells may be assigned implicit PUCCH resources linked to DL grant transmission resources (e.g., (E)CCE). Meanwhile, when cross-CC scheduling is not configured, a PFT resource corresponding to a PCell may be assigned an implicit PF1 resource, whereas a PF1 resource corresponding to an SCell may be assigned a specific one of a plurality of explicit PF1 resources (resource sets) (pre)configured through a higher-layer signal (e.g. RRC). For example, a PF1 resource indicated by an ART in a DL grant that schedules the SCell may be allocated to the PF1 resource corresponding to the SCell.

Unlike this, PF3 is applicable to a CA situation supporting up to 5 cells. The PF3 based scheme configures A/N (bits) corresponding to respective cells as one payload and maps/transmits a coded bit, generated through a series of coding (e.g., Reed Muller (RM) coding) processes, to a PF3 resource. The PF3 resource may be assigned one of a plurality of PF3 resources (pre)configured through a higher-layer signal (e.g., RRC) (regardless of whether cross-CC scheduling is configured). For example, a PF3 resource indicated by the ARI in the DL grant that schedules the SCell among the PF3 resources (pre)configured through RRC may be used for A/N transmission. The ARI may be included in a transmit power control (TPC) field of a PDCCH corresponding to a PDSCH on the SCell. PUCCH power control may be performed through a value of the TPC field in a PDCCH that schedules the PCell (i.e., a PDCCH corresponding to the PDSCH on the PCell). In TDD, the ARI may be included in a TPC field of a PDCCH other than a PDCCH that has an initial value of a DAI and schedules the PCell. In addition, in TDD, PUCCH power control may be performed through the value of the TPC field in the PDCCH that has the initial value of the DAI and schedules the PCell. The ARI is used interchangeably with a HARQ/ACK resource indication value. When a UE is configured to transmit A/N using PF3, the UE may transmit A/N using PF1 or PF3. Specifically, when scheduling is configured with respect only to the PCell in FDD or one subframe in the PCell (e.g., a subframe scheduled by the PDCCH having the initial value of the DAI) in TDD, the UE may transmit only A/N corresponding to such scheduling using (implicit) PF1 (linked to the DL grant) (hereinafter, fallback operation) and, otherwise, the UE transmits A/N for all CA-configured cells using PF3 indicated by the ARI.

The fallback operation in PF3 may be useful in that a PUCCH format occupying few resources (i.e., PF1) can be used, instead of a PUCCH format occupying relatively many resources (i.e., PF3), in a situation in which there is a small amount of actual data traffic (or scheduling for actual data traffic) although CA is configured for the UE. As an example, when PF1 is used, up to 36 UEs may be multiplexed in one PRB pair, whereas, when PF3 is used, up to 5 UEs may be multiplexed in one PRB pair. In a future system, since CA is configured using more cells and a new PUCCH format (hereinafter, PUCCH format 4 or PF4) occupying more resources may be configured for A/N feedback transmission for more cells, giving more opportunities for the fallback operation using a PUCCH format occupying few resources (e.g., PF1) may be efficient in terms of system resource usage. For example, PF4 may have a PUSCH-like structure. That is, PF4 may have the same structure as a PUSCH and occupy one or more PRBs in a frequency band. When PF4 is used, only one UE may be allocated in one or more PRB pair.

To this end, the present invention proposes a method of performing the fallback operation by applying CHsel with respect to some specific cells among all cells configured for the UE when PF3 or PF4 (hereinafter, referred to collectively as PF4) is configured for A/N feedback transmission in a CA situation. Hereinbelow, an application of CHsel to a plurality of cells is referred to as a multi-cell CHsel scheme and fallback based on the multi-cell CHsel scheme is referred to as multi-cell CHsel fallback.

A set of cells to which multi-cell CHsel fallback is applied among cells configured for the UE is referred to as CS1 and a set of the other cells except for the cells constituting CS1 is referred to as CS2. CS1 may include a PCell and one or more SCells and CS2 may include only one or more SCells. Meanwhile, if an ACell is configured, the cells configured for the UE may be categorized into CG1, which is a cell group corresponding to A/N to be transmitted through a PUCCH on the PCell, and CG2, which is a cell group corresponding to A/N to be transmitted through a PUCCH on the ACell. In this case, each cell group may include CS1 and CS2 and a method proposed in the present invention may be applied to each cell group.

In the following description, cross-CC scheduling may be limited to the case in which a scheduled cell is configured to be scheduled by the PCell (or ACell). As such, if the scheduled cell is configured to be scheduled by cells other than the PCell (or ACell), this may mean the case in which cross-CC scheduling is not configured.

A basic operation of the proposed method is as follows. It is assumed that, for the viewpoint of the UE, CS1 and CS2 are configured and PF4 (i.e., PF3 or PF4) is configured for A/N transmission. If the ACell is configured, the PCell in the proposed method may be replaced with the ACell.

If scheduling is configured only on CS1, the UE may transmit only A/N (state) for CS1 by applying multi-cell CHsel to CS1. The (A/N) state for CS1 may be transmitted using a specific PF1 resource on the PCell.

If scheduling is configured only on CS2, the UE may transmit all A/N feedbacks for both CS1 and CS2 by using PF4. That is, when (i) only CS2 is scheduled or (ii) both CS1 and CS2 are scheduled, all A/N feedbacks for both CS1 and CS2 may be transmitted using PF4.

Herein, a signal which is scheduled means a DL signal for which A/N feedback is demanded. In an LTE system, A/N feedback is performed with respect to (i) a PDSCH and (ii) a PDCCH indicating semi-persistent scheduling (SPS) release (hereinafter, a SPS release PDCCH). Hence, the meaning of "scheduling is configured on CSx" is that, on a cell in CSx, (i) a PDSCH with a corresponding PDCCH (i.e., a normal PDSCH) is detected, (ii) a PDSCH without a corresponding PDCCH (i.e., an SPS PDSCH) is detected, or (iii) an SPS release PDCCH is detected.

In this case, information signaled through a TPC field of a DL grant may be given as follows according to a cell that the DL grant schedules.

DL grant that schedules a PCell: TPC information of a PUCCH

DL grant that schedules an SCell belonging to CS1:

When cross-CC scheduling is configured, (i) additional TPC information may be signaled or (ii) neither TPC information nor an ARI may be signaled.

When cross-CC scheduling is not configured, an ARI indicating a CHsel candidate PF1 resource among a plurality of PF1 resources (pre)configured through higher layers (RRC) may be signaled.

DL grant that schedules CS2: an ARI indicating a PF4 resource used for A/N transmission among a plurality of PF4 resources (pre)configured through higher layers (e.g., RRC).

Hereinabove, in (i), a TPC field of the DL grant that schedules the SCell belonging to CS1 may be set to have the same value as a TPC field of the DL grant that schedules the PCell and one corresponding value may be used for PUCCH power control. Alternatively, the TPC field of the DL grant that schedules the SCell belonging to CS1 and the TPC field of the DL grant that schedules the PCell may have independent values and the sum of corresponding values may be used for PUCCH power control. In (ii), the TPC field of the DL grant that schedules the SCell belonging to CS1 may be filled with a predefined value (e.g., 00 or 11). In this case, the TPC field of the DL grant may be used to check whether the DL grant has been correctly received.

A candidate PF1 resource used for multi-cell CHsel may be allocated through the DL grant that schedules CS1. Specifically, for a cell for which cross-CC scheduling is configured among SCells belonging to CS1, an implicit PF1 resource linked to a PCell DL grant that schedules each cell may be allocated as the candidate PF1 resource. Meanwhile, for a cell for which cross-CC scheduling is not configured among the SCells belonging to CS1, an ARI indicating a CHsel candidate PF1 resource among a plurality of PF1 resources (pre)configured through higher layers (e.g., RRC) may be signaled through a DL grant corresponding to each cell.

Meanwhile, the number, M, of SCells that can be included in CS1 in an FDD situation (of a PCell) may be set to M=1 when spatial bundling is not applied and M=1/2/3 when spatial bundling is applied. Herein, spatial bundling means an operation of generating 1-bit A/N per cell by performing a logical AND operation between A/N states on a per-TB/CW basis in each cell. In a TDD situation (of the PCell), M may be set to M=1 when time bundling is not applied and M=1/2/3 when time bundling is applied. Herein, time bundling means an operation of generating 1-bit A/N per cell by performing a logical AND operation between A/N states on a per-subframe basis in each cell.

Figure 13:
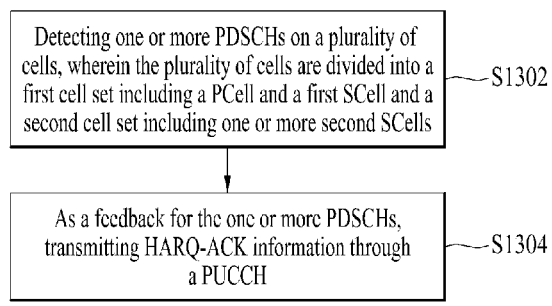
FIG. 13 illustrates an A/N transmission procedure according to an embodiment of the present invention.

FIG. 13 illustrates an A/N transmission method according to an embodiment of the present invention.

Referring to FIG. 13, a plurality of cells is aggregated for a UE. The plural cells may be divided into a first cell set including a PCell and a first SCell and a second cell set including one or more second SCells. Under this situation, the UE may detect one or more PDSCHs on the plural cells (S1302). Next, the UE may transmit HARQ-ACK information through a PUCCH as feedback for the one or more PDSCHs (S1304). In this case, if the one or more PDSCHs are detected only on the first cell set, the HARQ-ACK information may include HARQ-ACK responses only for the first cell set. On the other hand, if the one or more PDSCHs are detected at least on the second cell set, the HARQ-ACK information may include HARQ-ACK responses for both the first and second cell sets.

Specifically, if the one or more PDSCHs are detected only on the first cell set, the HARQ-ACK information may be transmitted using a first PUCCH format and, if the one or more PDSCHs are detected at least on the second cell set, the HARQ-ACK information may be transmitted using a second PUCCH format. Herein, the payload size of the second PUCCH format is greater than the payload size of the first PUCCH format. For example, the first PUCCH format may be PUCCH format 1b and the payload size of the first PUCCH format may be 2 bits. In addition, the second PUCCH format may be PUCCH format 3 or 4. If the one or more PDSCHs are detected only on the first cell set, the HARQ-ACK information may be transmitted using a PUCCH format 1b based channel selection scheme (i.e., multi-cell CHsel).

A TPC field of a PDCCH corresponding to a PDSCH detected in an SCell in the first cell set may be used to indicate power control information and a TPC field of a PDCCH corresponding to a PDSCH detected in an SCell in the second cell set may be used to indicate PUCCH resource indication information.

Meanwhile, in a situation in which a plurality of A/N states for DL data reception in a plurality of DL subframes in one cell is configured to be transmitted through one UL subframe, a DAI indicating a scheduling order in the plural DL subframes may be signaled through a DL grant. For this, a method of configuring/applying DL data scheduling (a DL subframe in which DAI signaling and DL data transmission are performed) corresponding to a specific DAI value (hereinafter, DAI-th) or less in CS1 for a multi-cell CHsel based fallback operation may be considered. Herein, the specific DAI value may be a positive integer less than a maximum DAI value available in a plurality of DL subframes.

Specifically, when scheduling is configured only on CS1 and only on up to DAI-th or less in CS1, the UE may apply multi-cell CHsel to DL data scheduling/transmission corresponding to DAI-th or less in CS1 (hereinafter, CS1 subset). That is, only A/N (state) for the CS1 subset may be transmitted using a specific PF1 resource on a PCell. Meanwhile, when scheduling/reception for DL data not belonging to the CS1 subset is performed, the UE may configure/transmit A/N feedback for both CS1 and CS2 using PF4. For example, when scheduling/reception for DL data corresponding to a DAI exceeding DAI-th in CS1 and/or DL data corresponding to CS2 is performed, the UE may configure/transmit A/N feedback for both CS1 and CS2 using PF4.

Herein, information signaled through a TPC field of a DL grant may be given as follows according to a cell that a DL grant schedules.

A DL grant that schedules a PCell (with respect only to a DL grant corresponding to the CS1 subset): TPC information of a PUCCH A DL grant that schedules an SCell belonging to CS1 (with respect only to a DL grant corresponding to the CS1 subset):
  When cross-CC scheduling is configured: (i) additional TPC information may be signaled or (ii) neither TPC information nor ARI information may be signaled.
  When cross-CC scheduling is not configured: an ARI indicating a CHsel candidate PF1 resource among a plurality of PFI resources (pre)configured through higher layers (e.g., RRC) may be signaled.

A DL grant not corresponding to a CS1 subset (i.e., a DL grant that schedules DL data not belonging to the CS1 subset): an ARI indicating a PF4 resource used for A/N transmission among a plurality of PF4 resources (pre) configured through higher layers (e.g., RRC).

Hereinabove, in (i), a TPC field of the DL grant that schedules the SCell belonging to CS1 may be set to have the same value as a TPC field of the DL grant that schedules the PCell and one corresponding value may be used for PUCCH power control. Alternatively, the TPC field of the DL grant that schedules the SCell belonging to CS1 and the TPC field of the DL grant that schedules the PCell may have independent values and the sum of corresponding values may be used for PUCCH power control. In (ii), the TPC field of the DL grant that schedules the SCell belonging to CS1 may be filled with a predefined value (e.g., 00 or 11). In this case, the TPC field of the DL grant may be used to check whether the DL grant has correctly been received.

A candidate PF1 resource used for multi-cell CHsel may be allocated through the DL grant that schedules CS1. Specifically, for a cell for which cross-CC scheduling is configured among SCells belonging to CS1 (with respect only to a DL grant corresponding to the CS1 subset), an implicit PF1 resource linked to a PCell DL grant that schedules each cell may be allocated as the candidate PFI resource. Meanwhile, for a cell for which cross-CC scheduling is not configured among the SCells belonging to CS1 (with respect only to a DL grant corresponding to the CS1 subset), an ARI indicating a CHsel candidate PF1 resource among a plurality of PFI resources (pre)configured through higher layers (e.g., RRC) may be signaled through a DL grant corresponding to each cell.

Meanwhile, a combination of the number, M, of SCells that can be included in CS1 and DAI-th for configuring the CS1 subset may be set to
  (M=0 and DAI-th=1 or 2) or (M=1 and DAI-th=1) when spatial bundling is not applied, and
  (M=0, DAI-th=1, 2, 3, or 4), (M=1, DAI-th=1 or 2), (M=2, DAI-th=1), or (M=3, DAI-th=1) when spatial bundling is applied.

Additionally, an independent (different) DAI-value per cell belonging to CS1 may be configured.

In the above proposal, the multi-cell CHsel fallback operation may be limitedly applied only when SCell(s) included in CS1 are configured only by cells for which cross-CC scheduling is configured (from a PCell). In this case, all candidate PF resources used for multi-cell CHsel may be configured by implicit PF1 resources. Hence, when a cell for which cross-CC scheduling is configured is not present, a legacy fallback scheme/operation may be applied. That is, if scheduling is configured only on a PCell in FDD or on one subframe in the PCell (e.g., a subframe scheduled by a PDCCH with a DAI initial value) in TDD, the UE may transmit only A/N corresponding to scheduling using an (implicit) PF1 linked to a DL grant (hereinafter, fallback operation) and, otherwise, the UE may transmit A/N for all CA-configured cells using PF4 indicated by an ARI.

As another method, the multi-cell CHsel scheme/operation may be applied in a state in which all cells configured for the UE or all cells in one CG (when PUCCH transmission to an SCell is configured) are configured by one CS1. To this end, spatial bundling or time bundling may be applied.

As still another method, when an ACell is configured, the multi-cell CHsel fallback scheme may be applied in a state in which the PCell and the ACell are configured by one CS1. Specifically, the multi-cell CHsel fallback scheme may be applied in a state in which the ACell is replaced with the SCell in CS1. As such, when scheduling is configured only on CS1 (i.e., the PCell and/or the ACell), the UE may transmit only A/N (state) for CS1 by applying multi-cell CHsel to CS1. In this case, A/N (state) for CS1 may be transmitted using a specific PF1 resource on the PCell. In addition, when the multi-cell CHsel based fallback operation is applied, the UE may reflect only a value of a TPC field signaled from a DL grant corresponding to the PCell into a PUCCH transmission power and a value of a TPC field in a DL grant corresponding to the ACell may be ignored because the TPC field in the DL grant corresponding to the ACell is used for power control for a PUCCH transmitted on the ACell. Meanwhile, the ACell may be configured to be cross-CC scheduled only from the PCell in addition to self-CC scheduled configuration. Herein, the ACell included in CS1 may be limitedly configured only by an ACell configured to be cross-CC scheduled from the PCell.

Meanwhile, in order to provide improved periodic CSI (p-CSI) feedback in a CA situation between a plurality of cells, a method may be considered in which, instead of legacy PUCCH format 2, PF3 (or PF4) which can transmit a larger payload is used as a new p-CSI dedicated PUCCH format. For convenience, PF3 (or PF4) configured as the p-CSI dedicated PUCCH is referred to as CSI-PF3. If an A/N transmission timing for CS1 (or CS1 subset) collides with a p-CSI reporting time in a situation in which scheduling is configured with respect only to CS1 (or CS1 subset), the UE may simultaneously transmit A/N for CS1 (subset) and p-CSI using CSI-PF3. TPC/ARI signaling through a DL grant corresponding to CS1 (subset) may be configured/applied in a manner similar to the above proposal.

Figure 14:
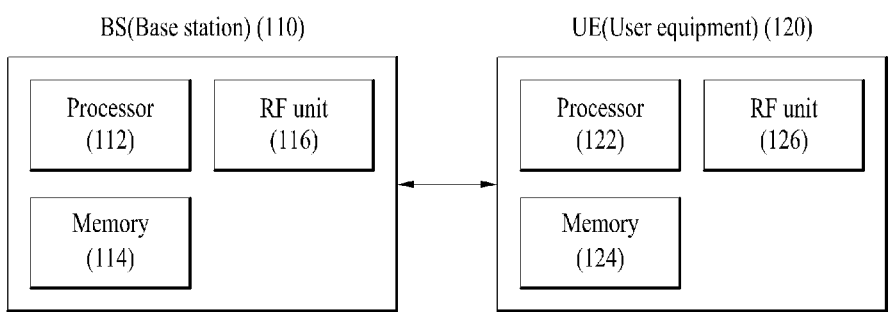
FIG. 14 illustrates a base station (BS) and a user equipment (UE) applicable to an embodiment of the present invention.

FIG. 14 illustrates a BS and a UE applicable to an embodiment of the present invention. When a system includes a relay, the BS or the UE may be replaced with the relay.

Referring to FIG. 15, an RF communication system includes a BS 110 and a UE 120. The BS 110 includes a processor 112, a memory 114 and an RF unit 116. The processor 112 may be configured to implement the procedures and/or methods proposed by the present invention. The memory 114 is connected to the processor 112 and stores various types of information relating to operations of the processor 112. The RF unit 116 is connected to the processor 112 and transmits and/or receives RF signals. The UE 120 includes a processor 122, a memory 124 and an RF unit 126. The processor 122 may be configured to implement the procedures and/or methods proposed by the present invention. The memory 124 is connected to the processor 122 and stores various types of information relating to operations of the processor 122. The RF unit 126 is connected to the processor 122 and transmits and/or receives RF signals. The BS 110 and the UE 120 may have a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a description is given, centering on a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to wireless communication apparatuses such as a UE, a relay, a BS, etc.

The invention claimed is:

1. A method of transmitting control information by a user equipment (UE) in a wireless communication system, the method comprising:

detecting one or more physical downlink shared channels (PDSCHs) on a plurality of cells, wherein the plural cells are divided into a first cell set including a primary cell (PCell) and a first secondary cell (SCell) and a second cell set including one or more second SCells; and transmitting hybrid automatic repeat request acknowledgement (HARQ-ACK) information through a physical uplink control channel (PUCCH) as feedback for the one or more PDSCHs, wherein, when the one or more PDSCHs are detected only on the first cell set, the HARQ-ACK information includes HARQ-ACK responses only for the first cell set and is transmitted using a channel selection scheme and, when the one or more PDSCHs are detected at least on the second cell set, the HARQ-ACK information includes HARQ-ACK responses for both the first and second cell sets, and wherein the channel selection scheme includes selecting one of PUCCH resources, and transmitting 2 bits corresponding to a set of HARQ-ACK responses for the PCell and the first SCell using the selected PUCCH resource.

2. The method according to claim 1, wherein, when the one or more PDSCHs are detected only on the first cell set, the HARQ-ACK information is transmitted using a first PUCCH format and, when the one or more PDSCHs are detected at least on the second cell set, the HARQ-ACK information is transmitted using a second PUCCH format, and a payload size of the second PUCCH format is greater than a payload size of the first PUCCH format.

3. The method according to claim 2, wherein the first PUCCH format is PUCCH format 1b.

4. The method according to claim 1, wherein a transmit power control (TPC) field of a physical downlink control channel (PDCCH) corresponding to a PDSCH detected in an SCell in the first cell set is used to indicate power control information and a TPC field of a PDCCH corresponding to a PDSCH detected in an SCell in the second cell set is used to indicate PUCCH resource indication information.

5. A user equipment (UE) for transmitting control information in a wireless communication system, the UE comprising:

a transceiver; and a processor, wherein the processor is configured to:

detect one or more physical downlink shared channels (PDSCHs) on a plurality of cells, the plural cells being divided into a first cell set including a primary cell (PCell) and a first secondary cell (SCell) and a second cell set including one or more second SCells, and transmit hybrid automatic repeat request acknowledgement (HARQ-ACK) information through a physical uplink control channel (PUCCH) as feedback for the one or more PDSCHs, wherein, when the one or more PDSCHs are detected only on the first cell set, the HARQ-ACK information includes HARQ-ACK responses only for the first cell set and is transmitted using a channel selection scheme and, when the one or more PDSCHs are detected at least on the second cell set, the HARQ-ACK information includes HARQ-ACK responses for both the first and second cell sets, and wherein the channel selection scheme includes selecting one of PUCCH resources, and transmitting 2 bits corresponding to a set of HARQ-ACK responses for the PCell and the first SCell using the selected PUCCH resource.

6. The UE according to claim 5, wherein, when the one or more PDSCHs are detected only on the first cell set, the HARQ-ACK information is transmitted using a first PUCCH format and, when the one or more PDSCHs are detected at least on the second cell set, the HARQ-ACK information is transmitted using a second PUCCH format, and a payload size of the second PUCCH format is greater than a payload size of the first PUCCH format.

7. The UE according to claim 6, wherein the first the first PUCCH format is PUCCH format 1b.

8. The UE according to claim 5, wherein a transmit power control (TPC) field of a physical downlink control channel (PDCCH) corresponding to a PDSCH detected in an SCell in the first cell set is used to indicate power control information and a TPC field of a PDCCH corresponding to a PDSCH detected in an SCell in the second cell set is used to indicate PUCCH resource indication information.

* * * * *